(12) United States Patent
Kim (10) Patent No.: US 6,604,375 B2
(45) Date of Patent: Aug. 12, 2003

(54) ONE-UNIT TYPE AIR CONDITIONER (75) Inventor: Jae-Soon Kim, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/092,351

(22) Filed: Mar. 7, 2002

(65) Prior Publication Data

US 2003/0084678 A1 May 8, 2003

(30) Foreign Application Priority Data

Nov. 8, 2001 (KR) .......................... 2001-69432

(51) Int. Cl.⁷ ............................................. F25D 23/12
(52) U.S. Cl. ............................. 62/262; 62/263; 62/429; 403/335
(58) Field of Search .................... 62/262, 263, 429, 62/298; 403/262, 335, 336; 248/300

(56) References Cited

U.S. PATENT DOCUMENTS

| | | | | |
|---|---|---|---|---|
| 4,102,148 A | * | 7/1978 | Matthews et al. | 62/77 |
| 4,736,597 A | * | 4/1988 | Anderson et al. | 62/239 |
| 4,977,750 A | * | 12/1990 | Metcalfe | 62/77 |
| 5,687,583 A | * | 11/1997 | Tunekawa et al. | 62/404 |
| 6,318,104 B1 | * | 11/2001 | Moraes et al. | 62/262 |
| 6,318,105 B1 | * | 11/2001 | Bushnell et al. | 62/262 |
| 6,412,298 B2 | * | 7/2002 | Kang et al. | 62/262 |
| 6,422,028 B1 | * | 7/2002 | Kim | 62/285 |
| 6,425,256 B1 | * | 7/2002 | Bushnell et al. | 62/262 |
| 6,430,955 B1 | * | 8/2002 | Moretti et al. | 62/279 |

* cited by examiner

Primary Examiner—William E. Tapolcai
Assistant Examiner—Mohammad M. Ali
(74) Attorney, Agent, or Firm—Staas & Halsey LLP (57) ABSTRACT

A one-unit type air conditioner is provided. The one-unit type air conditioner includes a cabinet defining the appearance of the air conditioner, a partition wall dividing the interior of the cabinet into indoor and outdoor sections, and a fan casing and an evaporator support frame installed in the cabinet in the indoor section of the partition wall. The partition wall includes a plate part transversely arranged in the interior of the cabinet to partition the interior into the indoor and outdoor sections, and a frame support part formed by cutting a part of the plate part to form a piece having a predetermined size and bending the piece toward the indoor section. The frame support part is spaced at a base thereof apart from the edge of the plate part by a predetermined distance and includes a margin disposed between the base of the frame support part and the edge of the plate part. The margin is bent toward the outdoor section to form a reinforcing flange for increasing the strength of the frame support part.

34 Claims, 7 Drawing Sheets

FIG. 6

ONE-UNIT TYPE AIR CONDITIONER

CROSS-REFERENCE TO RELATED APPLICATIONS

This application claims the benefit of Korean Application No. 2001-69432 filed Nov. 8, 2001 in the Korean Patent Office, the disclosure of which is incorporated herein by reference.

BACKGROUND OF THE INVENTION

1. Field of the Invention

The present invention relates, in general, to one-unit type air conditioners and, more particularly, to a one-unit type air conditioner having a partition wall used for dividing the interior of a cabinet into an outdoor section and an indoor section, a support extended from said partition wall toward the indoor section, and a reinforcing flange extended from said partition wall toward the outdoor section.

2. Description of the Related Art

Conventional air conditioners are classified into two types: one-unit type air conditioners wherein an evaporator for cooling room air, a compressor and a condenser for compressing and cooling refrigerant are installed in a single cabinet to form a single unit; and split type air conditioners wherein the evaporator is enclosed in an indoor cabinet and the compressor and condenser are enclosed in an outdoor cabinet to form an indoor unit and an outdoor unit. In such a one-unit type air conditioner, the interior of the single cabinet is partitioned into an indoor section and an outdoor section. An evaporator is installed in the indoor section while a compressor and a condenser are installed in the outdoor section. In order to partition the interior of the single cabinet into the indoor and outdoor sections, a partition wall is set in the cabinet.

Figure 1:
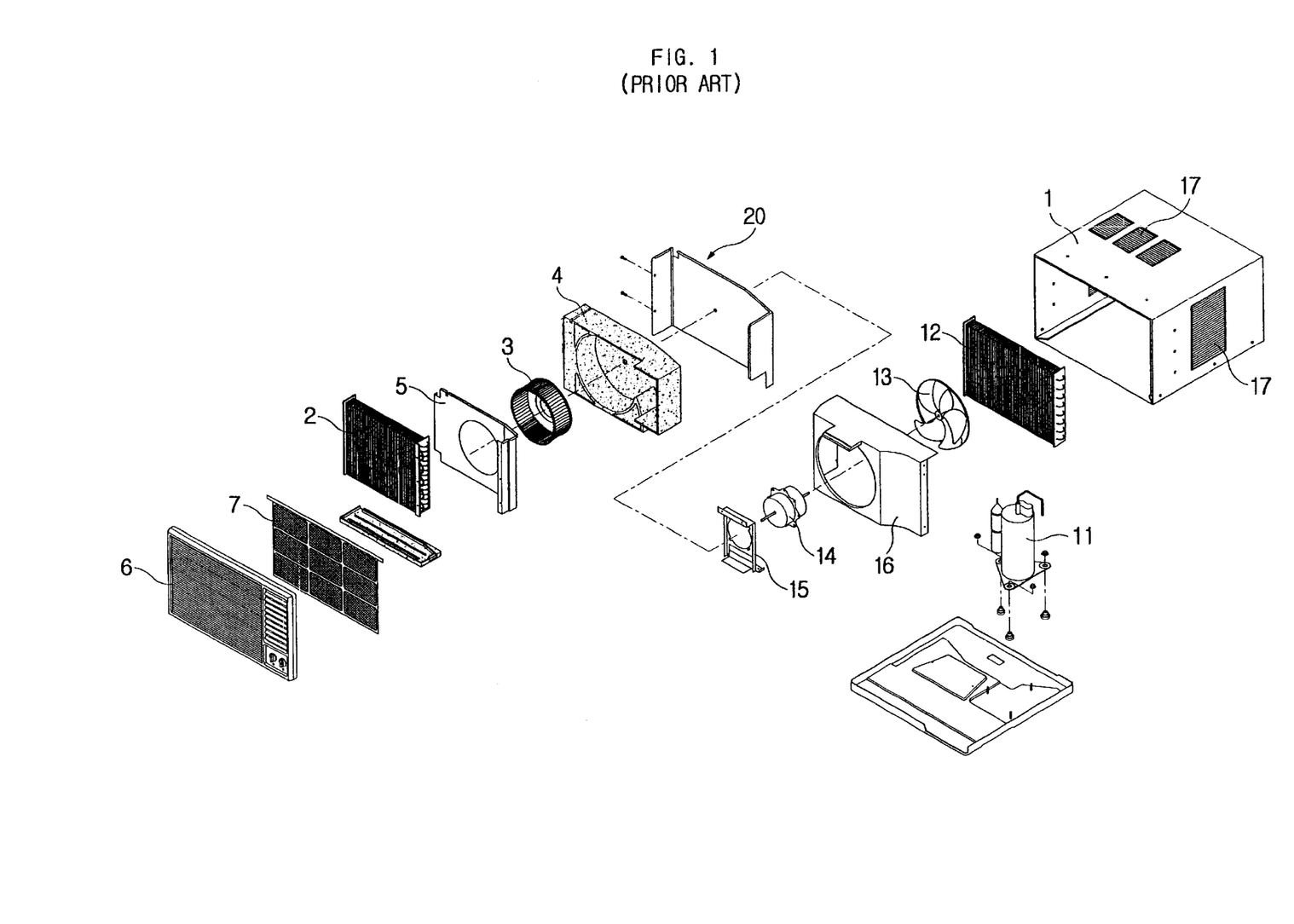
FIG. 1 is an exploded perspective view showing the construction of a one-unit type air condition having a conventional partition wall.

FIG. 1 is an exploded perspective view of a one-unit type air conditioner having a conventional partition wall. As shown in the drawing, the parts of the one-unit type air conditioner are enclosed in a box-shaped single cabinet 1, the interior of which is partitioned into an indoor section and an outdoor section by a partition wall 20. Installed in the indoor section defined in front of the partition wall 20 inside the cabinet 1 are an evaporator 2 for cooling room air and a sirocco fan 3 for sucking room air into the indoor section to make the room air pass through the evaporator 2 so as be cooled prior to being expelled into a room. The outdoor section seats a compressor 11 for compressing refrigerant flowing in a closed refrigerant circuit, a condenser 12 for cooling the hot refrigerant, and a propeller fan 13 sucking atmospheric air into the outdoor section to make it pass through the condenser 12. In order to drive both the sirocco fan 3 of the indoor section and the propeller fan 13 of the outdoor section during an operation of the air conditioner, a fan motor 14 is installed in the outdoor section.

In the indoor section, the sirocco fan 3 is installed in a first fan casing 4 disposed in front of the partition wall 20 while the evaporator 2 is mounted to the front surface of an evaporator support frame 5 arranged in front of the first fan casing 4. In the outdoor section, a motor bracket 15 for holding the fan motor 14 is mounted to the rear surface of the partition wall 20, and a second fan casing 16 is installed in a rear side of the motor bracket 15. The propeller fan 13 is mounted in the second fan casing 16. A front panel 6 having both an air suction grille and an air exhaust grille covers the front end of the cabinet 1 while an air filter 7 is disposed between the front panel 6 and the evaporator 2 for filtering air flowing from the front panel 6 to the evaporator 2. A rear panel (not shown) having an air exhaust grille for expelling atmospheric air from the cabinet 1 to the atmosphere covers the rear end of the cabinet 1 while a plurality of air suction grilles 17 are formed on the top and side walls of the cabinet 1.

During an operation of the one-unit type air conditioner, the fan motor 14 and the compressor 11 are operated. Room air is thus sucked into the indoor section of the cabinet 1 through the air suction grille of the front panel 6 by the fan motor 14, passes through the evaporator 2 so as to be cooled, and then is discharged into the room through the air exhaust grille of the front panel 6. In the mean time, atmospheric air is sucked into the outdoor section of the cabinet 1 through the air suction grilles 17 formed on the top and side walls of the cabinet 1, and cools the condenser 12 prior to being discharged to the atmosphere through the air exhaust grille of the rear panel (not shown).

In such a one-unit type air conditioner, the partition wall 20 isolates the outdoor section from the indoor section, thus preventing room air in the indoor section from being undesirably mixed with atmospheric air flowing in the outdoor section. The partition wall 20 also intercepts operational noise generated from both the compressor 11 and the propeller fan 13 disposed inside the outdoor section, and so the partition wall 20 prevents the noise from being transmitted to the room through the indoor section. Another function of the partition wall 20 is for supporting both the evaporator support frame 5 and the first fan casing 4 set in the indoor section of the cabinet 1.

Figure 2:
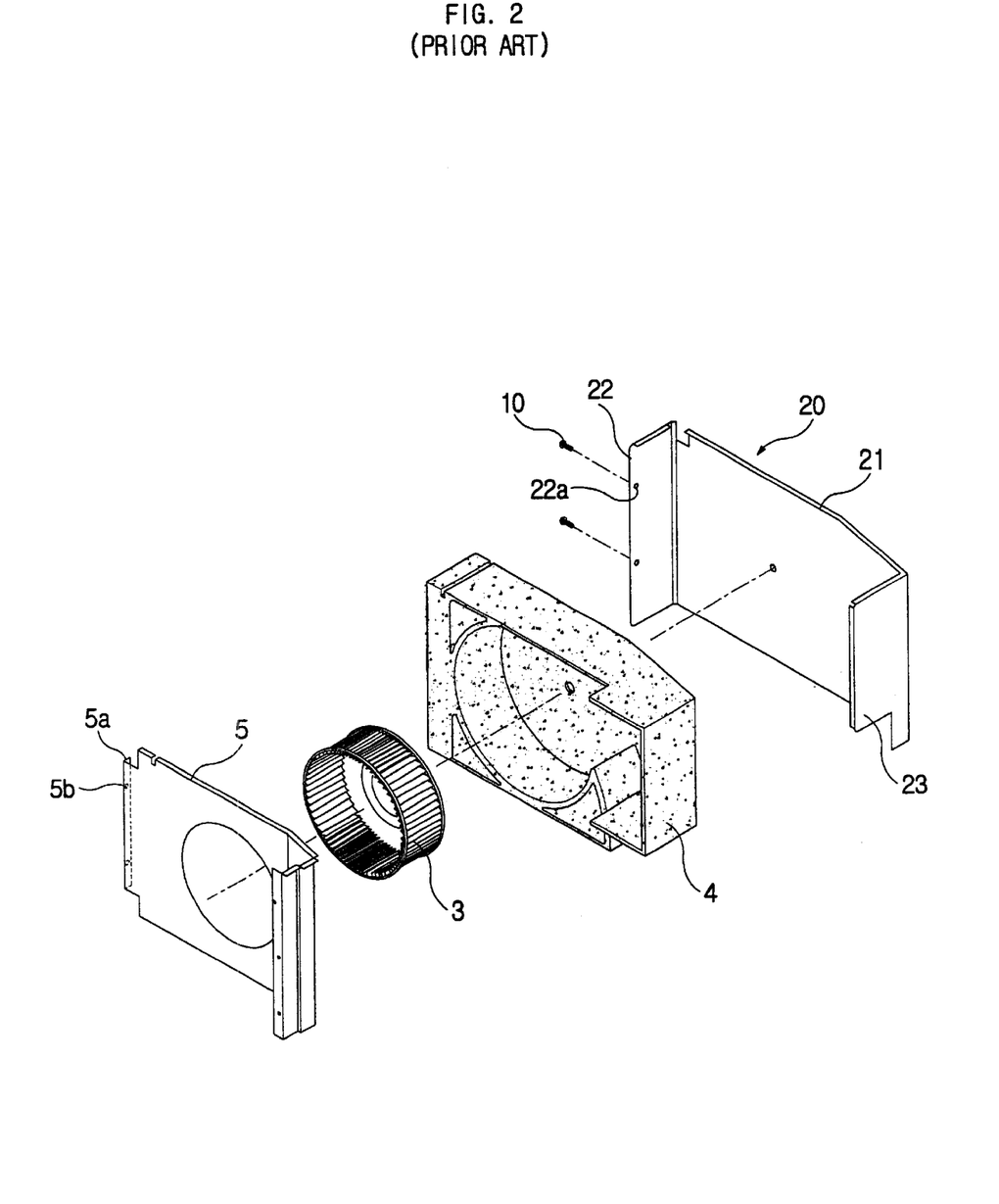
FIG. 2 is an exploded perspective view showing the partition wall, an evaporator support frame, a sirocco fan and a fan casing of the conventional one-unit type air conditioner.

As shown in FIG. 2, the conventional partition wall 20 is produced by bending the opposite side edges of a rectangular panel such that the partition wall 20 has two flanges. That is, this partition wall 20 includes a plate part 21 transversely arranged in the interior of the cabinet 1 to partition the interior into the indoor section and the outdoor section, a left flange 22, and a right flange 23. The left flange 22 and the right flange 23 are formed along the opposite sides of the plate part 21 by bending the opposite side edges of the partition wall 20 at an angle of about 90° such that the two flanges 22 and 23 are directed toward the indoor section. The two flanges 22 and 23 hold both the first fan casing 4 and the evaporator support frame 5. A plurality of screw holes 22a are formed along the edge of the left flange 22.

The evaporator support frame 5, assembled with the partition wall 20, is bent along its left edge at an angle of about 90° such that a flange 5a directed toward the partition wall 20 is provided at the left side of the frame 5. A plurality of screw holes 5b are formed along the flange 5a at positions corresponding to the screw holes 22a of the partition wall's left flange 22, and so the flange 5a of the frame 5 is screwed to the left flange 22 of the partition wall 20.

Figure 3:
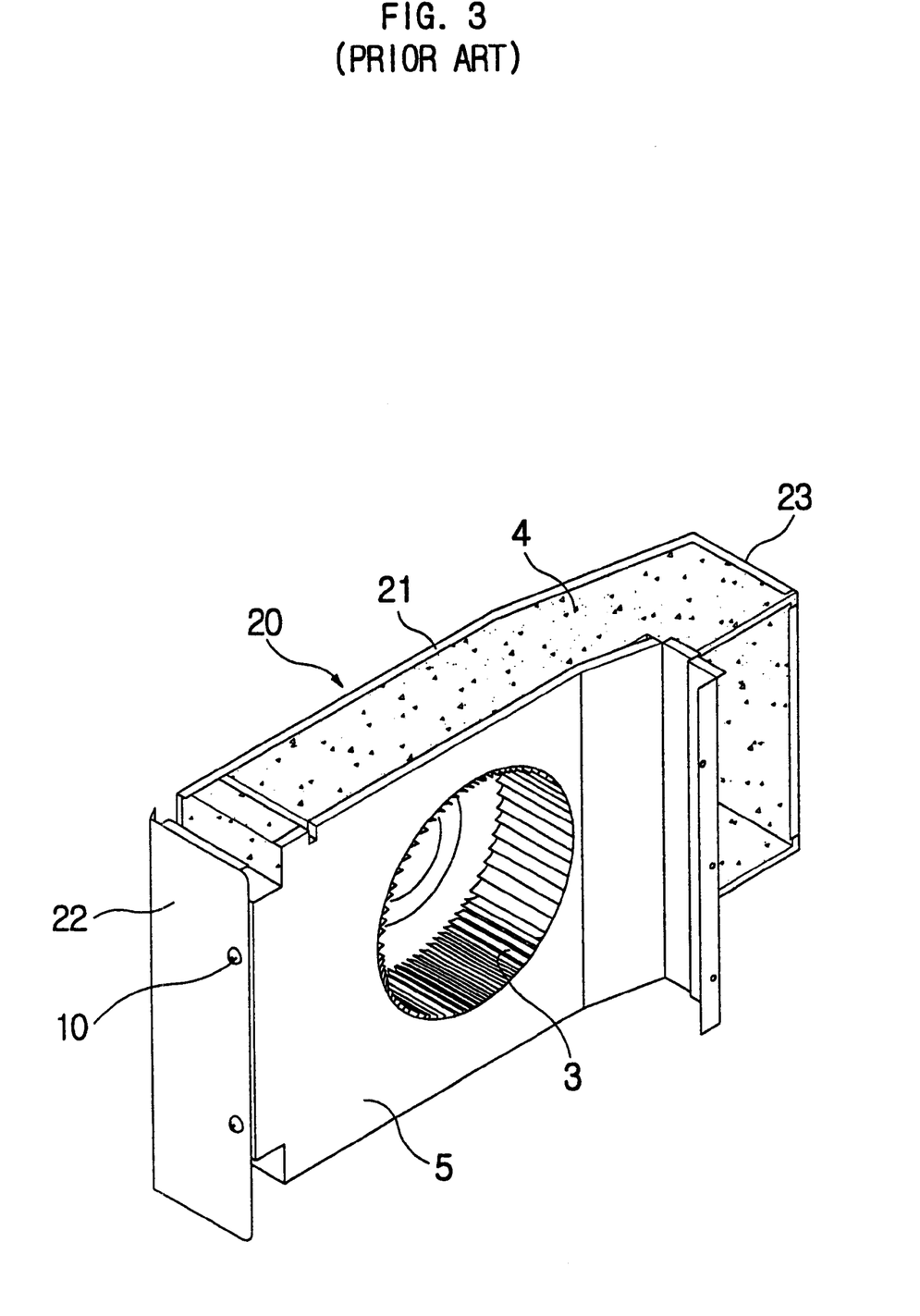
FIG. 3 is a perspective view showing the evaporator support frame and the conventional partition wall, completely assembled into a single body.

FIG. 3 shows the evaporator support frame 5 and the conventional partition wall 20 which are completely assembled with each other. As shown in the drawing, the partition wall 20 has the left flange 22, which is formed by bending the left edge of the partition wall 20 at an angle of 90° such that the flange 22 is formed along the left side of the plate part 21 while being directed toward the indoor section. In addition, the evaporator support frame 5 has the flange 5a with a predetermined width. This flange 5a is formed along the left side of the frame 5, and has the screw holes 5b corresponding to those of the left flange 22 of the partition wall 20 as shown in FIG. 2. Therefore, the evaporator support frame 5 is assembled with the partition wall 20 by driving a plurality of screws 10 into the aligned screw holes 5b and 22a of the two flanges 5a and 22 after the frame 5 is arranged relative to the partition wall 20 while the fan casing 4 having the sirocco fan 3 is disposed between the frame 5 and the partition wall 20.

However, the conventional partition wall 20 is problematic in that its left flange 22 wastes the material of the partition wall 20 since the flange 20 unnecessarily extends along the entire length of the side edge of the plate part 21 even though the flange 22 has a limited function of mounting the evaporator support frame 5 to the partition wall 20. Such wasteful consumption of the material caused by the flange 22 increases the production cost of the partition wall 20, and results in an increase in the price of one-unit type air conditioners, and thereby reduces market competitiveness of such air conditioners.

SUMMARY OF THE INVENTION

Accordingly, an object of the present invention is to provide a one-unit type air conditioner having a structurally improved partition wall designed to save the material thereof in an effort to reduce the production cost of such one-unit type air conditioners.

In order to accomplish the above and other objects, the present invention provides a one-unit type air conditioner having a cabinet defining an appearance of the air conditioner, a partition wall dividing an interior of the cabinet into sections, and a fan casing and an evaporator support frame installed in the cabinet in front of the partition wall. The the partition wall comprises: a plate part transversely arranged in the interior of the cabinet to partition the interior into an indoor section and an outdoor section, and a frame support part formed by cutting a part of the plate part to form a piece having a predetermined size, and bending the piece toward the indoor section.

In the one-unit type air conditioner of the present invention, the frame support part is spaced at a base thereof apart from the edge of the plate part by a predetermined distance. Thus a margin is disposed between the base of the frame support part and the edge of the plate part and is bent toward the outdoor section to form a reinforcing flange for increasing strength of the frame support part.

The frame support part has a length almost equal to the thickness of the fan casing, and is provided with a screw hole at the outside end thereof for being assembled with the evaporator support frame using a screw.

In addition, the frame support part is provided with an embossed portion for increasing the strength of the frame support part.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference now should be made to the drawings, in which the same reference numerals are used throughout the different drawings to designate the same or similar components.

Figure 4:
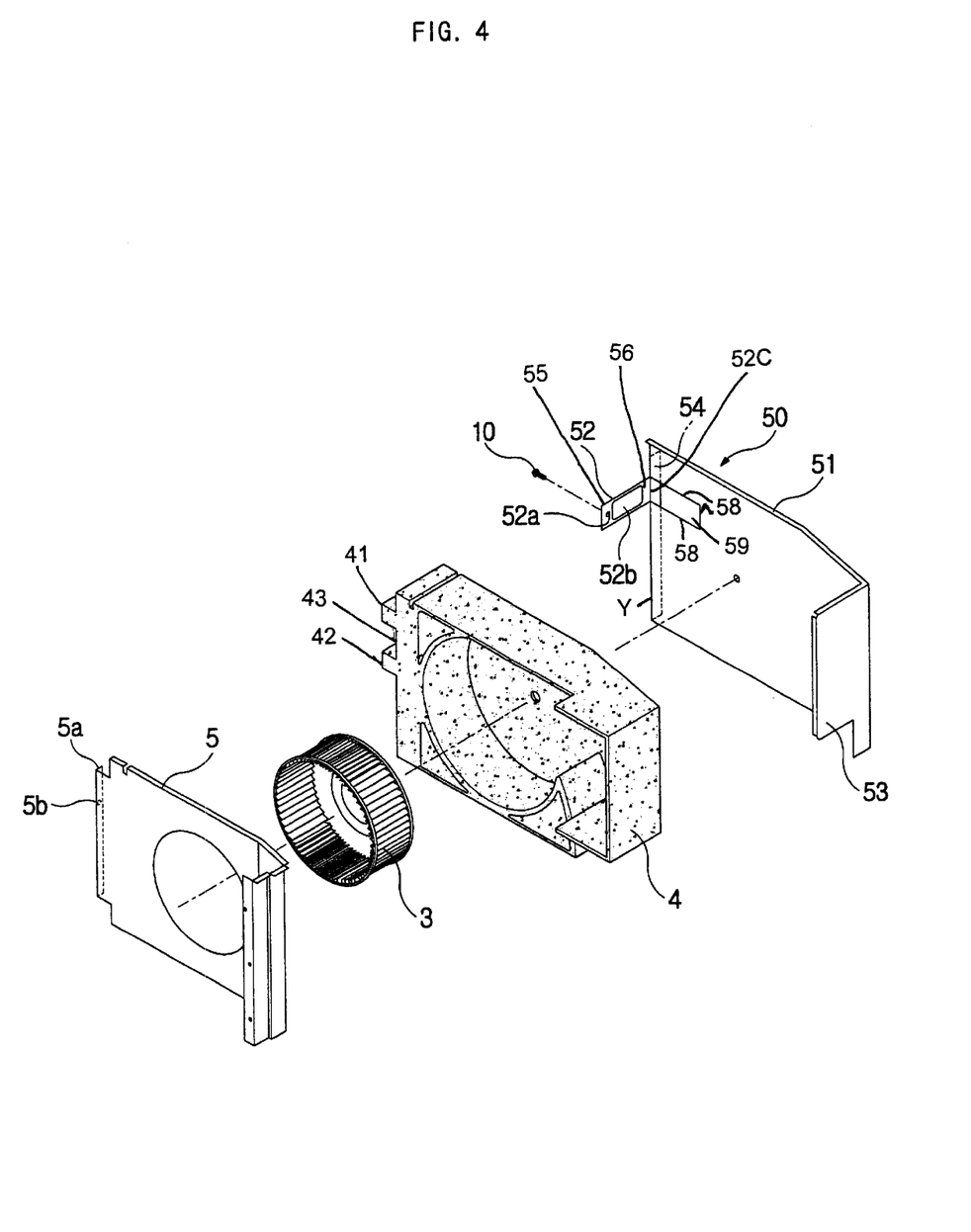
FIG. 4 is an exploded perspective view showing a partition wall, an evaporator support frame, a sirocco fan, and a fan casing of a one-unit type air conditioner according to an embodiment of the present invention.

FIG. 4 is an exploded perspective view showing a partition wall 50, an evaporator support frame 5, a sirocco fan 3, and a fan casing 4 of a one-unit type air conditioner according to an embodiment of the present invention. In the one-unit type air conditioner, the partition wall 50 divides the interior of a box-shaped single cabinet 1 FIG. 1)] into an indoor section and an outdoor section. The partition wall 50 is made of a single monolithic structure. The partition wall 50 includes a plate part 51 transversely arranged in the interior of the cabinet 1 to partition the interior into the indoor section and the outdoor section, and a right flange 53 is formed along the right side of the plate part 51 by bending the right edge of the wall 50 such that the flange 53 protrudes toward the indoor section.

In order to accomplish an object of this invention, the partition wall 50 has a frame support part 52 and a reinforcing flange 54. The frame support part 52 is used for mounting the evaporating support frame 5 to the partition wall 50 and is produced by cutting the left side of the panel of the partition wall 50 at a predetermined portion along cut line 58 to form a piece having a predetermined size and bending the piece at an angle of 90° about either one of an uncut base line 52c and a common line Y such that the piece is directed toward the indoor section and forms the desired frame support part 52.

A proximal end 56 of the frame support part 52 is disposed on the common line while a distal end 55 of the frame support part 52 is extended from the plate part 51 toward the indoor section. The plate part 51 is formed with a cutout portion 59 in which the frame support part 52 is disposed.

In addition, the left edge of the partition wall 50 outside the frame support part 52 is bent at an angle of 90° such that the edge is directed toward the outdoor section and forms the reinforcing flange 54. In a brief description, the frame support part 52 and the reinforcing flange 54 of the partition wall 50 are perpendicularly formed at the left side of the plate part 51 such that the frame support part 52 is directed toward the indoor section while the reinforcing flange 54 is directed toward the outdoor section.

The frame support part 52 has a length almost equal to the thickness of the fan casing 4, and is provided with a screw hole 52a at its outside end. The evaporator support frame 5, assembled with the partition wall 50, is bent along its left edge at an angle of about 90°, such that a flange 5a directed toward the partition wall 50 is provided at the left side of the frame 5. A screw hole 5b is formed on the flange 5a at a position corresponding to the screw hole 52a of the frame support part 52 of the partition wall 50. Therefore, the evaporator support frame 5 is assembled with the partition wall 50 by driving a locking screw 10 into the aligned screw holes 5b and 52a of the flange 5a and the frame support part 52. The frame 5 is arranged relative to the partition wall 50 with the fan casing 4 having the sirocco fan 3 disposed between the frame 5 and the partition wall 50.

The fan casing 4 includes two protrusions 41, 42 and a groove 43 disposed between two protrusions 41, 42. The frame support part 52 is inserted into the groove 43 when coupled to the flange 5a of the evaporating support frame 5.

In the embodiment of this invention, each of the flange 5a of the evaporator support frame 5 and the frame support part 52 of the partition wall 50 has one screw hole 5b or 52a. However, it should be understood that two or more screw holes may be formed on each of the flange 5a of the evaporator support frame 5 and the frame support part 52 of the partition wall 50 in accordance with the size of the frame support part 52.

Figure 5A:
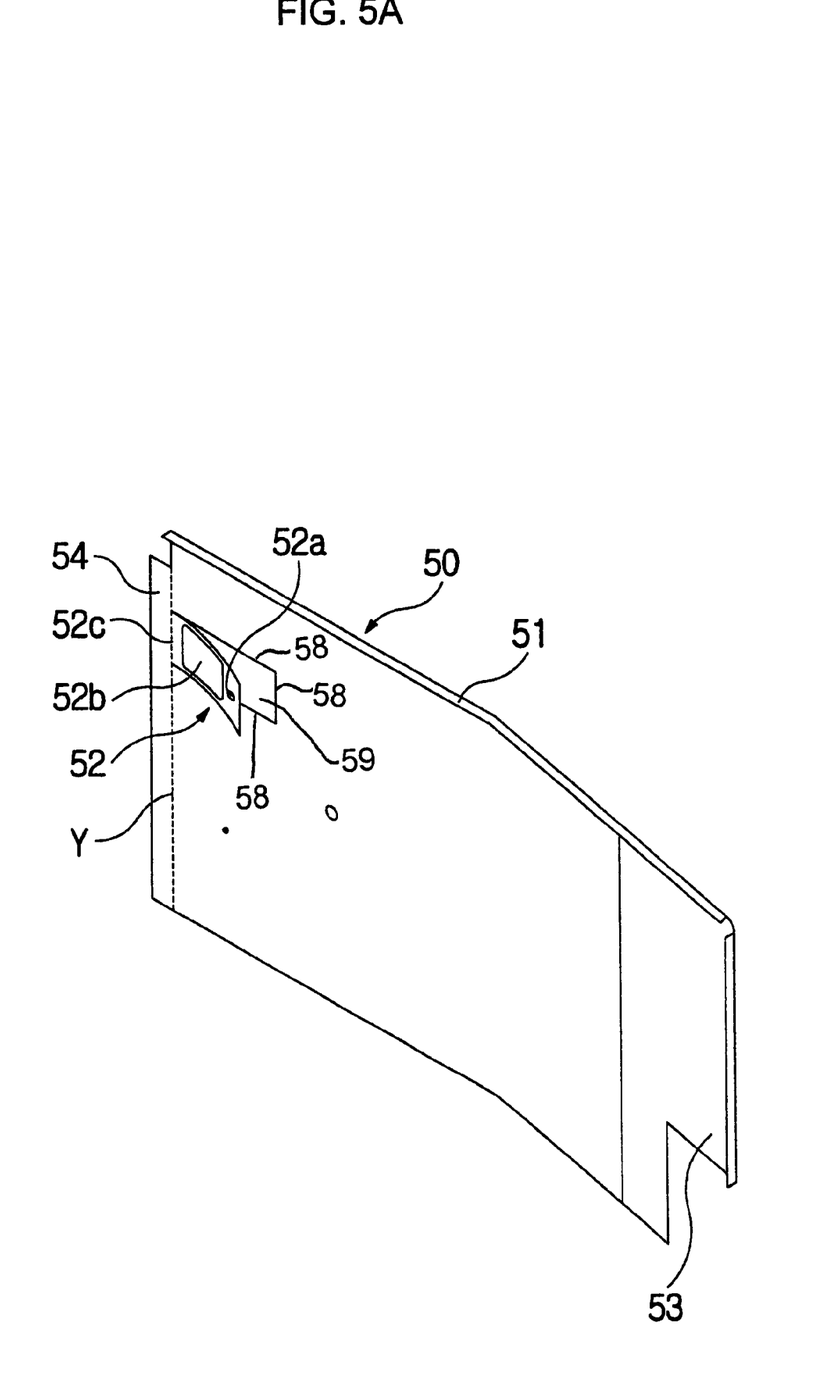
FIGS. 5A and 5B are perspective views of the partition wall for showing the process of producing the partition wall of the invention.
Figure 5B:
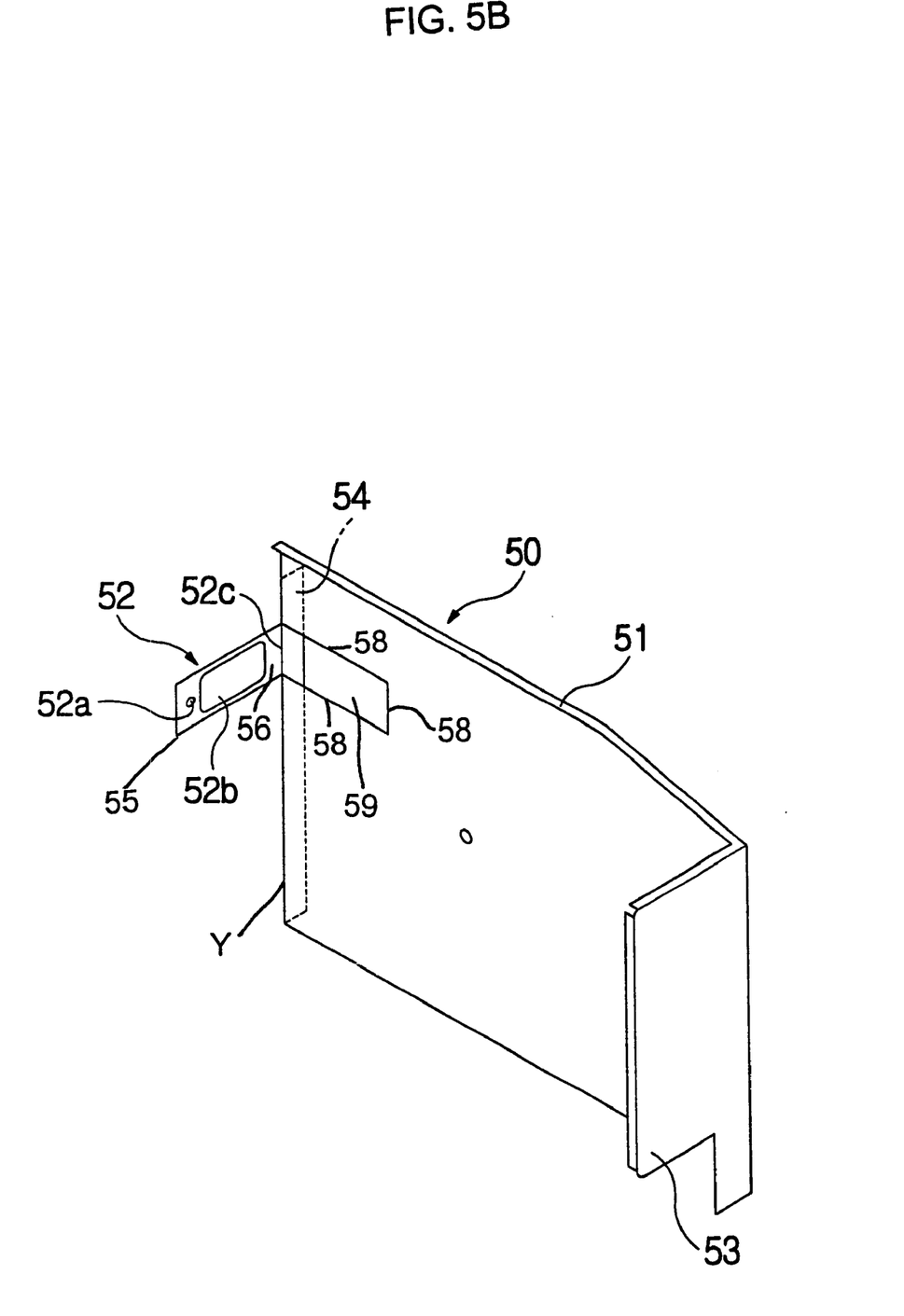

FIGS. 5A and 5B are views showing the process of producing the partition wall 50 of this invention. That is, FIG. 5A shows the step of cutting the panel of the partition wall 50 at a predetermined portion to form the frame support part 52. FIG. 5B shows the step of perpendicularly bending the frame support part 52 toward the indoor unit and of bending the opposite edges of the panel of the partition wall 50 in opposite directions to form the right flange 53 and the reinforcing flange 54.

As shown in FIG. 5A, the left side of the rectangular panel of the partition wall 50 is cut at a predetermined portion along the cut line 58 to form the frame support part 52. The length of the frame support part 52 is almost equal to the thickness of the fan casing 4 as shown in FIG. 4. The shape and the size of the frame support part 52 is the same as the cutout portion 59 of the plate part 51. In order to form the frame support part 52, the rectangular panel of the partition wall 50 is cut along a U-shaped cut line 58 at the predetermined portion of the panel's left side to form a rectangular piece. In such a case, the two ends of the U-shaped cut line 58 are terminated at positions equally spaced apart from the left edge of the panel of the partition wall 50, and the uncut base line 52c is formed between the two ends of the cut line. The rectangular piece is, thereafter, bent at an angle of 90° along the uncut base line 52c, thus forming the desired frame support part 52. The distal end 55 of the frame support part 52 has the screw hole 52a at its free end. In the present invention, the screw hole 52a may be formed on the frame support part 52 before or after bending the piece.

When the rectangular panel of the partition wall 50 is cut along the U-shaped cut line at the predetermined portion of the panel's left side to form the piece for the frame support part 52 as described above, a left margin having a constant width is left on the panel outside a vertical line "Y" aligned with the uncut base line 52c. The margin, defined between the left edge of the partition wall 50 and the vertical line "Y" aligned with the uncut base line 52c, forms the reinforcing flange 54.

After cutting the piece for the frame support part 52 on the panel of the partition wall 50, the piece and the left margin are bent in opposite directions along the vertical line "Y" aligned with the uncut base line 52c as shown in FIG. 5B. The piece forms the frame support part 52 directed toward the indoor section of the cabinet 1 seating the evaporator support frame 5 therein, while the left margin forms the reinforcing flange 54 directed toward the outdoor section seating a condenser 12 (see FIG. 1) therein. Due to the reinforcing flange 54 bent from the plate part 51 in a direction opposite to that of the frame support part 52, it is possible to secure a desired strength of the frame support part 52 for supporting the evaporator support frame 5. The plate part 51 of the partition wall 50 is formed with a cutout portion 51a since the flame support part 52 has been taken out from the plate part 51.

When the frame support part 52 and the reinforcing flange 54 are bent from the plate part 51 in opposite directions as described above, the right edge of the partition wall 50 is bent toward the indoor section, thus forming the right flange 53 covering the right side surface of the fan casing 4.

In an effort to further increase the strength of the frame support part 52, an embossed portion 52b is formed on the frame support part 52 such that the profile line of the embossed portion 52b extends along the edge of the frame support part 52. The embossed portion 52b may be formed on the frame support part 52 during the step of cutting the panel of the partition wall 50 to form the piece for the frame support part 52 as shown in FIG. 5A. Alternatively, the embossed portion 52b may be formed on the frame support part 52 during the step of bending the frame support part 52 and the reinforcing flange 54 as shown in FIG. 5B.

Figure 6:
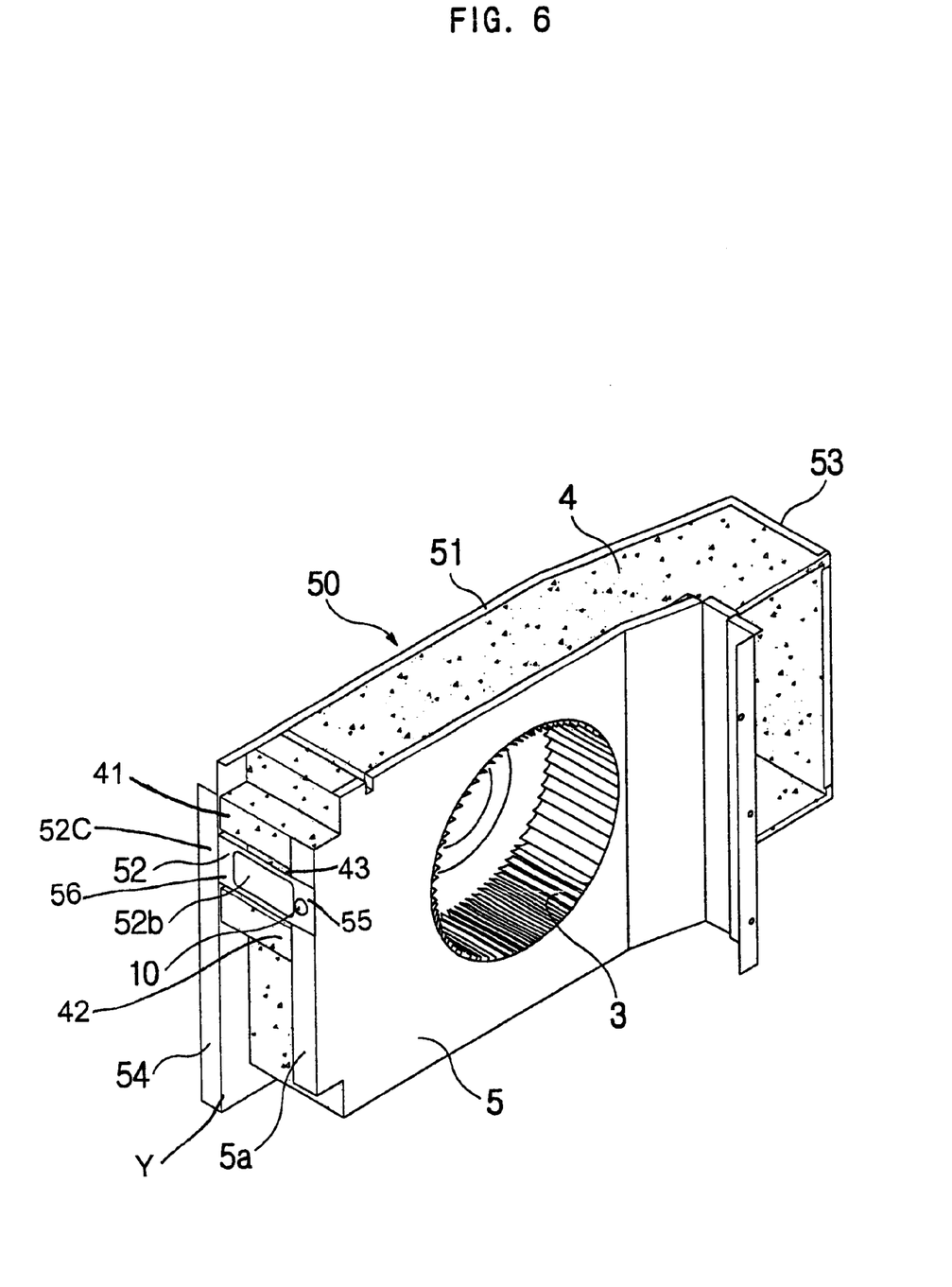
FIG. 6 is a perspective view showing an evaporator support frame and the partition wall of the present invention, completely assembled into a single body.

FIG. 6 is a perspective view showing the evaporator support frame 5 and the partition wall 50, which are completely assembled into a single body using the locking screw 10. As shown in the drawing, the evaporator support frame 5 is assembled with the partition wall 50 by driving the locking screw 10 into the aligned screw holes 5b and 52a of the flange 5a of the evaporator support frame 5 and the frame support part 52 of the partition wall 50 after appropriately arranging the frame 5 relative to the partition wall 50 with the fan casing 4 having the sirocco fan 3 interposed between the frame 5 and the partition wall 50. Therefore, the frame support part 52 of this invention stably supports the evaporator support frame 5 even though the frame support part 52 does not extend along the entire length of the side edge of the plate part 51 of the partition wall 50, but is formed by cutting only a part of the partition wall 50 to have a very small size in comparison with the length of the flange 5a of the evaporator support frame 5.

As described above, the present invention provides a one-unit type air conditioner with a structurally improved partition wall. In the partition wall of this invention, a frame support part, used for supporting the evaporator support frame when assembling the evaporator support frame with the partition wall into a single body, is formed by cutting a part of the panel of the partition wall, different from a conventional frame support structure extending along the entire length of the side edge of the partition wall. This partition wall thus saves the material thereof, and reduces the production cost of the one-unit type air conditioners, and thereby improves market competitiveness of such air conditioners.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A one-unit type air conditioner having a cabinet, a partition wall dividing an interior of said cabinet into sections, and a fan casing and an evaporator support frame installed in said cabinet in front of said partition wall, said partition wall comprising:

a plate part transversely arranged in said interior of said cabinet to partition the interior into an indoor section and an outdoor section; and a frame support part cut from a part of said plate part to form a piece having a predetermined size and bent toward said indoor section.

2. The air conditioner of claim 1, wherein said frame support part is spaced at a base thereof apart from an edge of said plate part by a predetermined distance, having a margin between said base of said frame support part and said edge of said plate part, said margin being bent toward said outdoor section to form a reinforcing flange for increasing strength of said frame support part.

3. The air conditioner of claim 2, wherein said frame support part has a length being the same as a thickness of said fan casing, and having a screw hole formed at an outside end thereof for assembly with said evaporator support frame using a screw.

4. The air conditioner of claim 2, wherein said frame support part has an embossed portion for increasing the strength of said frame support part.

5. The air conditioner of claim 2, wherein said frame support part is parallel to said margin while being perpendicular to said plate part.

6. The air conditioner of claim 2, wherein said frame support part has an angle with a main plane of said plate part.

7. The air conditioner of claim 2, wherein said frame support part is perpendicular to said main plate part.

8. The air conditioner of claim 2, wherein said frame support part is disposed on a common plane of said margin.

9. The air conditioner of claim 1, further comprising a groove formed on said fan casing to accommodate insertion of said frame support part.

10. The air conditioner of claim 9, further comprising a pair of protrusions formed on said fan casing, said groove formed between said protrusions.

11. The air conditioner of claim 9, wherein said groove is parallel to said frame support part while having an angle with said plate part.

12. The air conditioner of claim 1, said frame support part having a height less than that of said plate part while having a width less than that of said plate part.

13. The air conditioner of claim 1, said plate part and said frame support part being made of a single body in a monolithic structure.

14. An air conditioner, comprising:
a cabinet;
a partition disposed within said cabinet, having a main plate dividing the interior of said cabinet into an indoor section and an outdoor section, said main plate having a cutting line and a common line for forming a cutout portion; and
a support having a proximal end and a distal end, said distal end detached from said main plate along said cutting line while said proximal end of said support is not detached from said main plate, said distal end extended from said main plate toward said indoor section.

15. The air conditioner of claim 14, said support having the same shape as said cutout portion formed on said main plate.

16. The air conditioner of claim 14, said support and said partition being a single body in a monolithic structure.

17. The air conditioner of claim 14, said proximal end of said support disposed on said common line of said main plate.

18. The air controller of claim 14, said proximal end and said common line being spaced-apart from an edge of said main plate.

19. The air conditioner of claim 14, further comprising a reinforcing flange formed between an edge of said main plate and said common line of said main plate.

20. The air conditioner of claim 19, said reinforcing flange bent toward said outdoor section from said main plate.

21. The air conditioner of claim 14, said support coupled to a component casing disposed within said indoor casing.

22. An air conditioner, comprising:
a cabinet;
a partition disposed within said cabinet, dividing the interior of said cabinet into an indoor section and an outdoor section; and
a reinforcing flange formed on an edge of said partition, bent toward said outdoor section;
a support disposed adjacent to said reinforcing flange, spaced-apart from said edge of said partition, bent toward said indoor section; and
said partition having a cutout portion corresponding to said support.

23. The air conditioner of claim 22, wherein said reinforcing flange and said support are bent in opposite directions and parallel to each other.

24. The air conditioner of claim 22, said cutout portion having either one of the same shape and the same size as said support.

25. The air conditioner of claim 22, further comprising a side flange formed on a second edge of said partition opposite to said reinforcing flange, bent toward said indoor section, coupled to a component disposed between said support and said side flange.

26. The air conditioner of claim 25, said support being a height greater than either one of said extension and said reinforcing flange.

27. An air conditioner, comprising:
a cabinet;
a partition disposed within said cabinet, having a main plate dividing the interior of said cabinet into an indoor section and an outdoor section, said partition having a first height; and
a support extended from said partition toward said indoor section, having a second height less than said first height of said partition.

28. The air conditioner of claim 27, further comprising a reinforcing flange extended from said partition toward said out door section, having a third height greater than said second height of said support.

29. The air conditioner of claim 28, wherein said reinforcing flange and said support are extended toward opposite directions and parallel to each other.

30. The air conditioner of claim 27, wherein said second height of said partition is the same as that of said indoor section.

31. An air conditioner, comprising:
a cabinet;
a partition wall dividing an interior of said cabinet into an indoor section and an outdoor section;
an evaporator support frame disposed within said indoor section, holding an evaporator disposed within said indoor section;
a fan casing disposed between said partition and said evaporator support frame, having a groove formed on said fan casing; and
a support extended from said partition toward said indoor section, connected to said evaporator support frame while disposed in said groove of said fan casing.

32. The air conditioner of claim 31, further comprising a plurality of protrusions formed on said fan casing, said groove disposed between said protrusions.

33. The air conditioner of claim 31, wherein said support has a height less than that of said partition.

34. The air conditioner of claim 31, further comprising a reinforcing flange extended from said partition toward said outdoor section.

* * * * *